US012602290B2

(12) United States Patent
Yamane

(10) Patent No.: US 12,602,290 B2
(45) Date of Patent: Apr. 14, 2026

(54) DATA SAVING METHOD, DATA SAVING SYSTEM, AND NON-VOLATILE STORAGE MEDIUM RECORDING DATA SAVING PROGRAM

(71) Applicant: Panasonic Automotive Systems Co., Ltd., Kanagawa (JP)

(72) Inventor: Ichiro Yamane, Kyoto (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 47 days.

(21) Appl. No.: 18/777,756

(22) Filed: Jul. 19, 2024

(65) Prior Publication Data

US 2024/0370338 A1　　Nov. 7, 2024

Related U.S. Application Data

(63) Continuation of application No. PCT/JP2022/045829, filed on Dec. 13, 2022.

(30) Foreign Application Priority Data

Jan. 21, 2022　(JP) ................................. 2022-007989

(51) Int. Cl.
　*G06F 12/00*　　(2006.01)
　*G06F 11/1446*　　(2026.01)
(52) U.S. Cl.
　CPC ................................. *G06F 11/1446* (2013.01)
(58) Field of Classification Search
　CPC . G06F 11/1446; G06F 11/1461; B60W 10/00; B60W 20/00; F02D 45/00; G07C 5/085
　See application file for complete search history.

(56) References Cited

U.S. PATENT DOCUMENTS

| | | | | |
|---|---|---|---|---|
| 4,853,856 | A | * | 8/1989 | Hanway .................. G01P 1/122 |
| | | | | 360/6 |
| 5,311,430 | A | | 5/1994 | Ishigami |
| 2002/0155865 | A1 | | 10/2002 | Aoyama |
| 2006/0103436 | A1 | * | 5/2006 | Saitou .................. H03K 17/223 |
| | | | | 327/142 |

(Continued)

FOREIGN PATENT DOCUMENTS

| | | |
|---|---|---|
| JP | 05-104985 | 4/1993 |
| JP | 2001-202728 | 7/2001 |
| JP | 2001-285451 | 10/2001 |

(Continued)

OTHER PUBLICATIONS

International Search Report (ISR) from International Searching Authority (Japan Patent Office) in International Pat. Appl. No. PCT/JP2022/045829, dated Mar. 7, 2023, together with an English language translation.

(Continued)

*Primary Examiner* — Shawn X Gu
(74) *Attorney, Agent, or Firm* — Greenblum & Bernstein, P.L.C.

(57) ABSTRACT

A data saving method includes: detecting a predetermined sign of turning on of an ignition power supply in a vehicle performing a saving process of saving data in a storage apparatus; and stopping the saving process before the turning on of the ignition power supply when the predetermined sign is detected.

19 Claims, 7 Drawing Sheets

(56)　　　　　　References Cited

U.S. PATENT DOCUMENTS

2017/0200330 A1* 7/2017 Gupta .................. G06F 3/0604
2020/0086878 A1* 3/2020 Ohtomo ................. B60R 25/24

FOREIGN PATENT DOCUMENTS

JP　　　2006-023163　　　1/2006
JP　　　2008-242597　　　10/2008
WO　　WO-2012018204 A2 * 2/2012　......... H02J 7/00716

OTHER PUBLICATIONS

English language translation of Office Action from Japan Patent
Office (JPO) in Japanese Patent Appl. No. 2022-007989, dated Nov.
25, 2025.
English language translation of Office Action from Japan Patent
Office (JPO) in Japanese Patent Appl. No. 2022-007989, dated Sep.
9, 2025.

* cited by examiner

DATA SAVING METHOD, DATA SAVING SYSTEM, AND NON-VOLATILE STORAGE MEDIUM RECORDING DATA SAVING PROGRAM

TECHNICAL FIELD

The present disclosure relates to a data saving method, a data saving system, and a non-volatile storage medium recording a data saving program.

BACKGROUND ART

In recent years, automobiles have been performing various information processing for cruise control of the automobiles, driving assist of drivers of the automobiles, and the like. A storage apparatus for storing data such as a program code for performing such information processing and data referred to by the program is mounted in the automobiles.

In such automobiles, there has been a possibility that when an engine starter is activated while the data is being saved in a nonvolatile storage apparatus, a power supply voltage temporarily drops and the data cannot be normally saved in the nonvolatile storage apparatus, and moreover the data already saved in the nonvolatile storage apparatus is destroyed.

In order to solve such a problem, Patent Literature (hereinafter, referred to as "PTL") 1 discloses a data saving apparatus that performs a process of saving data in a temporary storage area when a speed of a vehicle is lower than a predetermined speed, and saves data in a storage area in which existing data is saved from the temporary storage area in a case where the speed of the vehicle is equal to or higher than the predetermined speed and activation of an engine starter by a driver is thus impossible.

CITATION LIST

Patent Literature
PTL 1
 Japanese Patent Application Laid-Open No. 2006-23163

SUMMARY OF INVENTION

Technical Problem

However, in the conventional technique disclosed in PTL 1, data is saved in the temporary storage area even when the ignition of the vehicle is turned on. Accordingly, an activation time is prolonged due to a load applied to a vehicle activation process of the vehicle. Thus, it becomes difficult to satisfy a condition imposed on the activation time.

One non-limiting and exemplary embodiment of the present disclosure facilitates providing a data saving method, a data saving system, and a non-volatile storage medium recording a data saving program which can easily satisfy a condition imposed on a vehicle activation time.

Solution to Problem

A data saving method according to one exemplary embodiment of the present disclosure includes: detecting a predetermined sign of turning on of an ignition power supply in a vehicle performing a saving process of saving data in a storage apparatus; and stopping the saving process before the turning on of the ignition power supply when the predetermined sign is detected.

A data saving system according to one exemplary embodiment of the present disclosure includes: a sign detector, which, in operation, detects a predetermined sign of turning on of an ignition power supply in a vehicle performing a saving process of saving data in a storage apparatus; and a stop controller, which, in operation, stops the saving process before the turning on of the ignition power supply when the predetermined sign is detected.

A non-volatile storage medium recording a data saving program according to one exemplary embodiment of the present disclosure causes a computer to execute: a sign detecting procedure of detecting a predetermined sign of turning on of an ignition power supply in a vehicle performing a saving process of saving data in a storage apparatus; and a stopping procedure of stopping the saving process before the turning on of the ignition power supply when the predetermined sign is detected.

Advantageous Effects of Invention

According to one exemplary embodiment of the present disclosure, it is possible to easily satisfy a condition imposed on an activation time of a vehicle.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
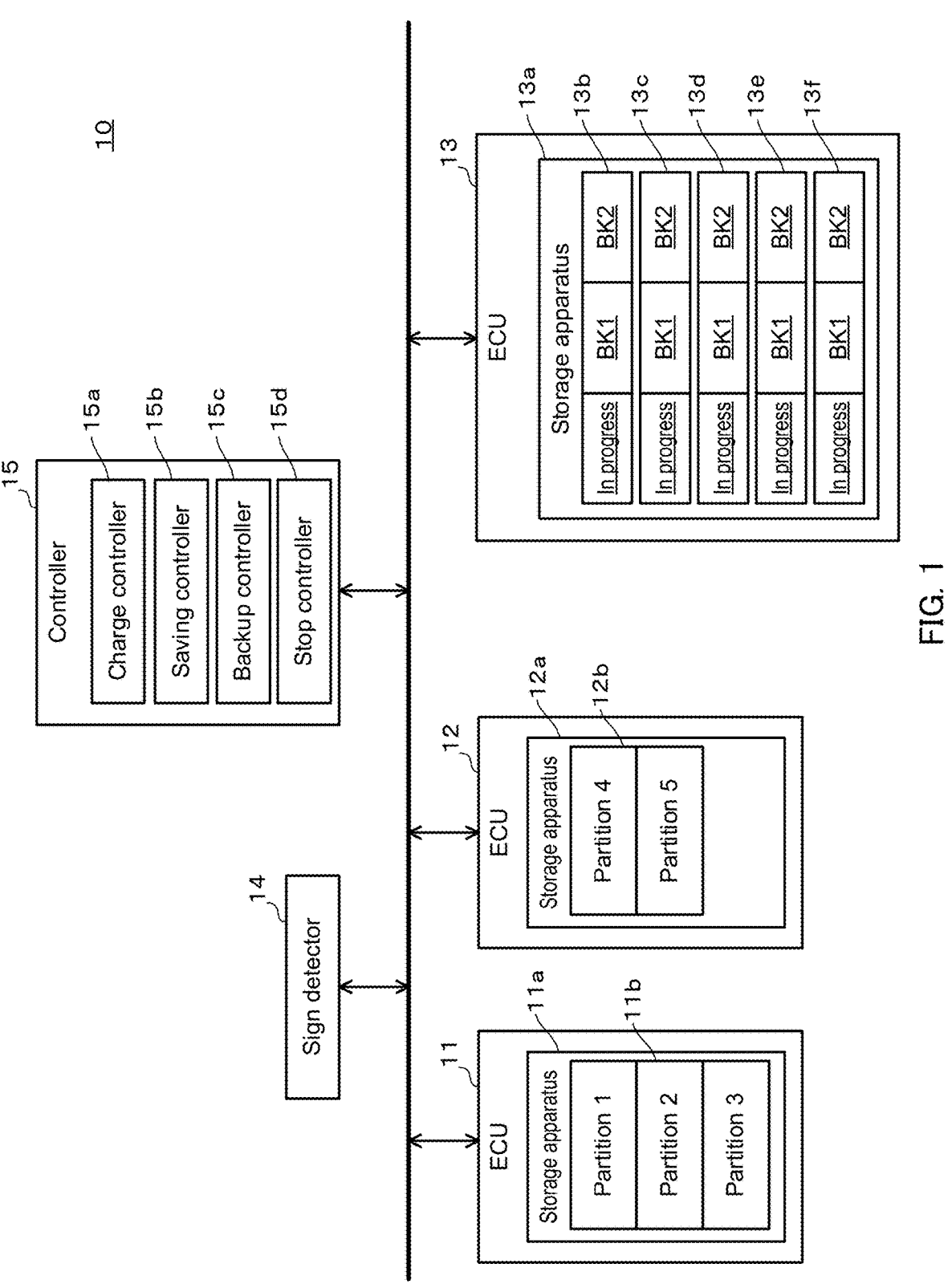
FIG. 1 illustrates an exemplary configuration of a data saving system according to an embodiment of the present disclosure.

Hereinafter, preferred embodiments of the present disclosure will be described in detail with reference to the appended drawings. Note that elements having substantially the same functions are assigned the same reference numerals in the description and drawings to omit duplicated descriptions thereof.

Embodiment 1

FIG. 1 is a diagram illustrating an exemplary configuration of data saving system 10 according to the present embodiment. Data saving system 10 is a system mounted on a vehicle, and saves data such as program codes used for various information processing and data referred to by the programs when performing cruise control of the vehicle, driving assist for a driver of the vehicle, and the like. The vehicle in the example of FIG. 1 is a chargeable vehicle such as an electric car or a plug-in hybrid car.

Data saving system 10 includes, for example, Electronic Control Units (ECUs) 11 to 13, sign detector 14, and controller 15.

ECUs 11 and 12 are an electronic control unit including a processor that performs various kinds of information processing when performing cruise control of the vehicle, driving assist for a driver of the vehicle, and the like. ECUs 11 and 12 include storage apparatuses 11a and 12a such as memories, and storage apparatuses 11a and 12a save data such as program codes used for various types of information processing and data referred to by the programs in storage areas 11b and 12b.

In FIG. 1, storage area 11b of storage apparatus 11a is divided into three partitions of partition 1, partition 2, and partition 3, and storage area 12b of storage apparatus 12a is divided into two partitions of partition 4 and partition 5.

ECU 13 is an electronic control unit including a processor that performs a process of saving data such as program codes saved in storage apparatuses 11a and 12a and backup data of data referred to by the programs. ECU 13 includes storage apparatus 13a such as a memory.

In the example of FIG. 1, storage apparatus 13a includes five storage areas 13b to 13f. Each of storage areas 13b to 13f is an area for saving backup data of data saved in partitions 1 to 5 of storage apparatuses 11a and 12a.

Here, each of storage areas 13b to 13f has an area for which the flag "in progress" is set, an area for which the flag "BK1" is set, and an area for which the flag "BK2" is set.

The area for which the flag "in progress" is set is an area in which the data currently subjected to the backup process is saved. The area for which the flag "BK1" is set is an area in which data from a generation ago that was backed up during a previous backup process is saved. The area for which the flag "BK2" is set is an area in which data from two generations ago that was backed up during the backup process before the previous backup process is saved.

Sign detector 14 detects a predetermined sign of turning on of an ignition power supply in the vehicle performing a saving process for saving the backup data in storage apparatus 13a.

For example, when a charge process performed for the vehicle that is an electric vehicle or a plug-in hybrid vehicle is completed, sign detector 14 detects the completion of the charge process as the sign, assuming an increased possibility that the ignition switch is turned on and the vehicle is activated. Other examples of the above sign will be described in detail in Embodiments 2 to 4.

Controller 15 is a control apparatus such as a processor that controls data saving system 10. Controller 15 includes charge controller 15a, saving controller 15b, backup controller 15c, and stop controller 15d.

Charge controller 15a controls the charge process for the vehicle when the vehicle is connected to an external power source. Specifically, charge controller 15a detects that the vehicle is connected to the external power source, detects and controls a current or a voltage, detects a charge amount in a storage battery, detects that the vehicle is disconnected from the external power source, and the like.

Saving controller 15b controls a storage process for storing, in storage apparatuses 11a and 12a, data such as program codes used for various information processing executed when the cruise control of the vehicle, the driving assist for the driver of the vehicle, and the like, and data referred to by the programs.

Backup controller 15c controls a process of backing up, in storage apparatus 13a, data stored in storage apparatuses 11a and 12a.

Specifically, at the time of the backup process, backup controller 15c backs up the data saved in storage apparatuses 11a and 12a in the storage areas for which the flag "in progress" is set. When the vehicle is an electric vehicle or a plug-in hybrid vehicle, backup controller 15c performs such a backup process during the charge process of charging the vehicle.

Thereafter, when the backup process is completed, backup controller 15c changes the flag "BK2" to the flag "in progress", changes the flag "BK1" to the flag "BK2", and changes the flag "in progress" to the flag "BK1".

When the next backup process is performed, backup controller 15c saves the latest backup data in the storage areas for which the flag "in progress" is set, and overwrites the backup data from two generations ago with the latest backup data.

By repeating such a process, backup controller 15c manages the latest backup data, the backup data from one generation ago, and the backup data from two generations ago.

When sign detector 14 detects a predetermined sign of turning on of the ignition power supply of the vehicle, such as the completion of the charge process for the electric vehicle or plug-in hybrid vehicle during execution of the backup process for data in storage apparatus 13a, stop controller 15d instructs backup controller 15c to stop the backup process before the ignition power supply is turned on. The completion of the charge process is detected by receiving a signal from charge controller 15a.

Here, the ignition power supply is turned on by pressing an ignition switch or the like or turning an ignition key inserted into a key cylinder.

Since it takes only about one second or less to stop the backup by stop controller 15d after sign detector 14 detects the sign, stop controller 15d can stop the backup process prior to the turning on of the ignition power supply.

Thus, a load applied to the activation process of the vehicle is reduced and the activation time of the vehicle is shortened. Accordingly, a condition imposed on the activation time can be easily satisfied.

Figure 2:
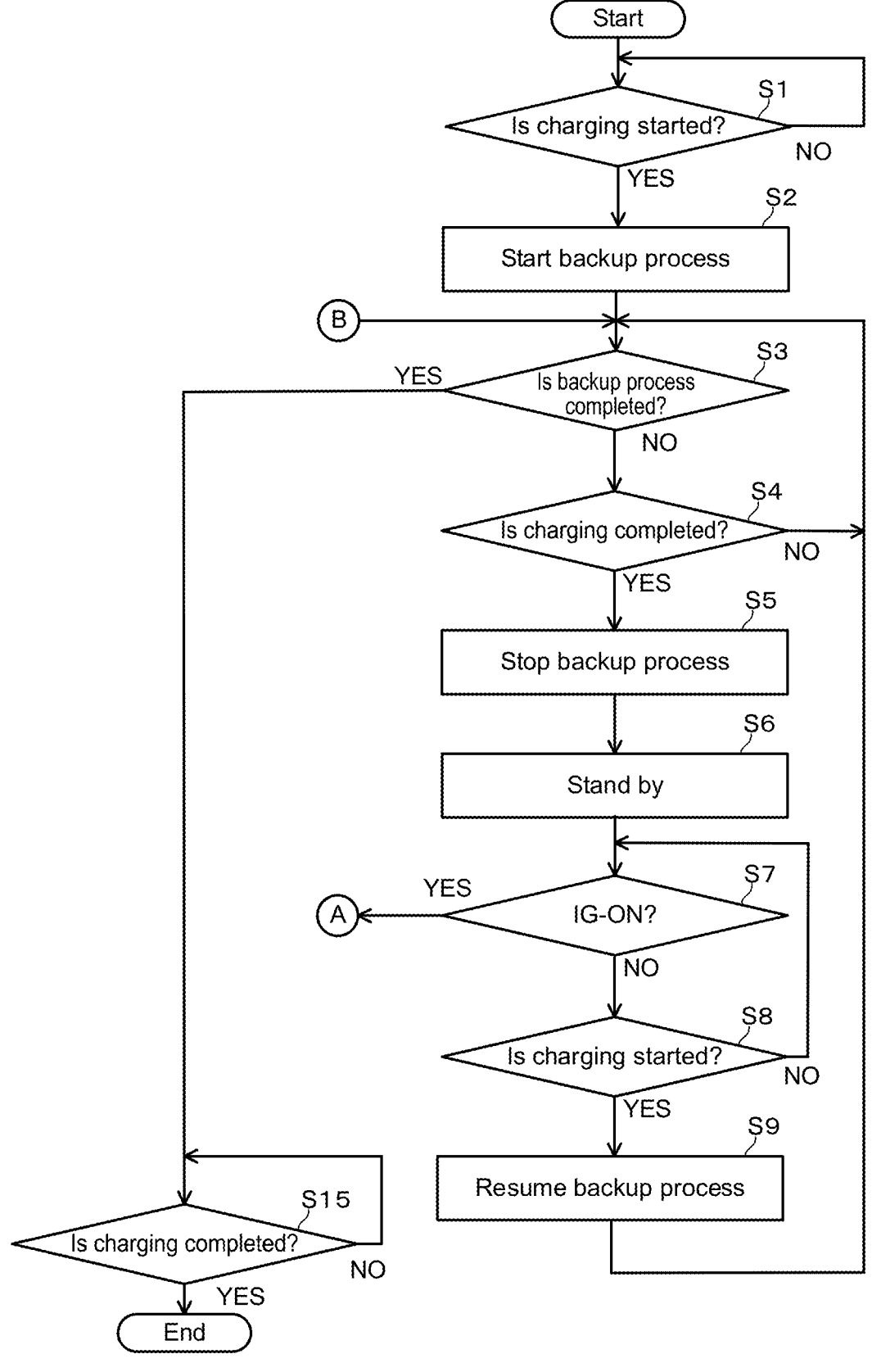
FIG. 2 is a flowchart for explaining an example of a data backup control process according to Embodiment 1.
Figure 3:
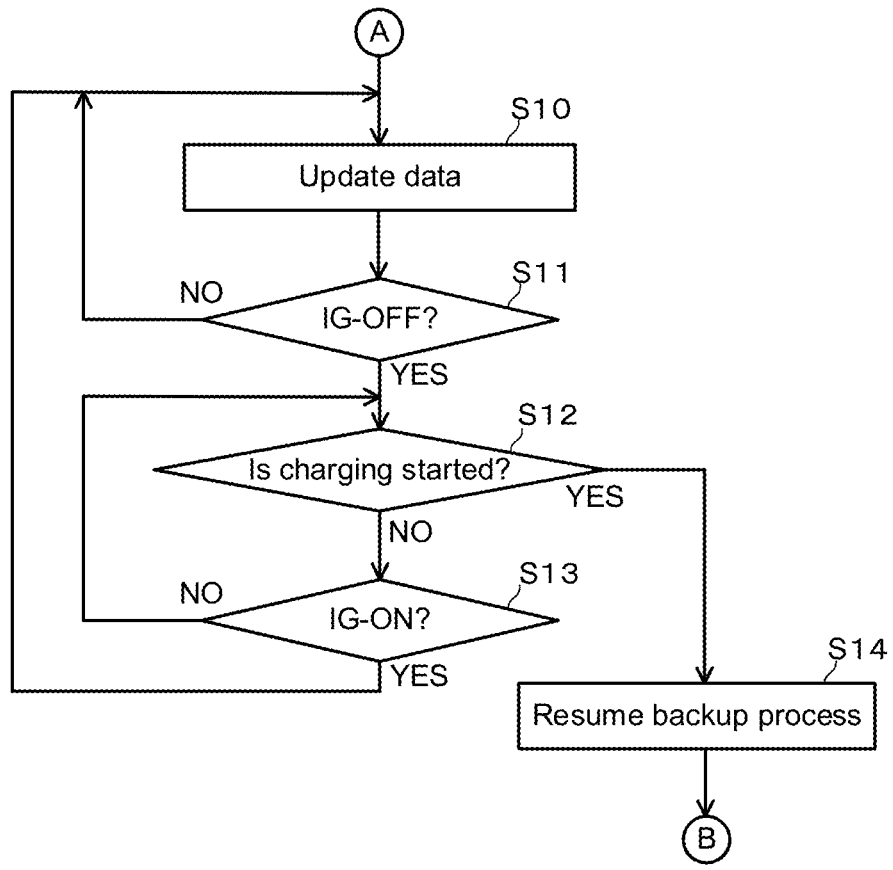
FIG. 3 is a flowchart for explaining an example of the data backup control process according to Embodiment 1.

Next, a data backup control process according to Embodiment 1 will be described with reference to FIGS. 2 and 3. FIG. 2 and FIG. 3 are flowcharts illustrating an example of the data backup control process according to Embodiment 1.

As illustrated in FIG. 2, backup controller 15c first determines whether or not the charge process for the vehicle has been started (step S1). When the charge process for the vehicle has not been started (step S1: NO), the process of step S1 is repeated until the charge process is started.

When the charge process for the vehicle has been started (step S1: YES), backup controller 15c starts the data backup process (step S2). This backup process will be described in detail later with reference to FIG. 4.

Thereafter, backup controller 15c determines whether or not the backup process has been completed (step S3). When the backup process has been completed (step S3: YES), charge controller 15a detects a charge amount of the storage battery and determines whether or not the charge has been completed (step S15).

When the charge is not completed (step S15: NO), the process of step S15 is repeated. When the charge is completed (step S15: YES), a series of processes including the data backup process are completed.

In step S3, when the backup process has not been completed (step S3: NO), sign detector 14 determines whether or not the charge process has been completed (step S4). When the charge process has been completed, it is expected that the ignition power supply of the vehicle will be turned on thereafter, and thus sign detector 14 performs the above process as one means for detecting the sign of turning on the ignition power supply of the vehicle.

When the charge process has not been completed (step S4: NO), the process after step S3 is repeated. When the charge process has been completed (step S4: YES), stop controller 15d instructs backup controller 15c to stop the backup process (step S5). Since this process can be executed in a short time, the backup process is stopped before the ignition power supply is turned on. Then, backup controller 15c enters a standby status (step S6).

Thereafter, backup controller 15c determines whether or not the ignition power supply has been turned on (step S7). When the ignition power supply has not been turned on (step S7: NO), backup controller 15c determines whether or not the charge has been restarted (step S8).

When the charge has not been started (step S8: NO), the process after step S7 is repeated. When the charge has been started (step S8: YES), backup controller 15c resumes the backup process (step S9).

In this case, since the ignition power supply has not been turned on, the data saved in storage apparatuses 11a and 12a has not been updated. Therefore, backup controller 15c resumes the backup process with the data saved when the backup process was stopped in step S5.

For example, it is assumed that data saved in partition 1 illustrated in FIG. 1 to data saved in partition 5 are sequentially backed up to storage apparatus 13a. When the backup is stopped during the backup process for the data saved in partition 2, backup controller 15c resumes the backup process with the data.

In step S9, after the data backup process is resumed, the processes after step S3 are repeated.

In step S7, when the ignition power supply is turned on (step S7: YES), the data saved in storage apparatuses 11a and 12a may be updated as illustrated in FIG. 3 (step S10).

Backup controller 15c determines whether or not the ignition power supply has been turned off (step S11). When the ignition power supply has not been turned off (step S11: NO), the process after step S10 is repeated.

When the ignition power supply is turned off (step S11: YES), backup controller 15c determines whether or not the charge is restarted (step S12). When the charge is restarted (step S12: YES), backup controller 15c resumes the backup process (step S14).

In this case, there is a possibility that the data saved in storage apparatuses 11a and 12a has been updated in step S10. Thus, backup controller 15c resumes the backup process with the first data in the partition in which pieces of data saved when the backup process was stopped in step S5 are saved.

Note that backup controller 15c may determine whether or not the data has been updated, and when the data has not been updated, restart the backup process with the data saved when the backup process was stopped, as in the process of step S9.

For example, it is assumed that data saved in partition 1 illustrated in FIG. 1 to data saved in partition 5 are sequentially backed up to storage apparatus 13a. When the backup is stopped during the backup process for the data saved in partition 2, backup controller 15c resumes the backup process with the first data saved in partition 2. Thereafter, the processes after step S3 illustrated in FIG. 1 are repeated.

In step S12, when the charge has not been started (step S12: NO), backup controller 15c determines whether or not the ignition power supply has been turned on (step S13). When the ignition power supply has not been turned on (step S13: NO), the process after step S12 is repeated. On the other hand, when the ignition power supply has been turned on (step S13: YES), the processes after step S10 are repeated.

Figure 4:
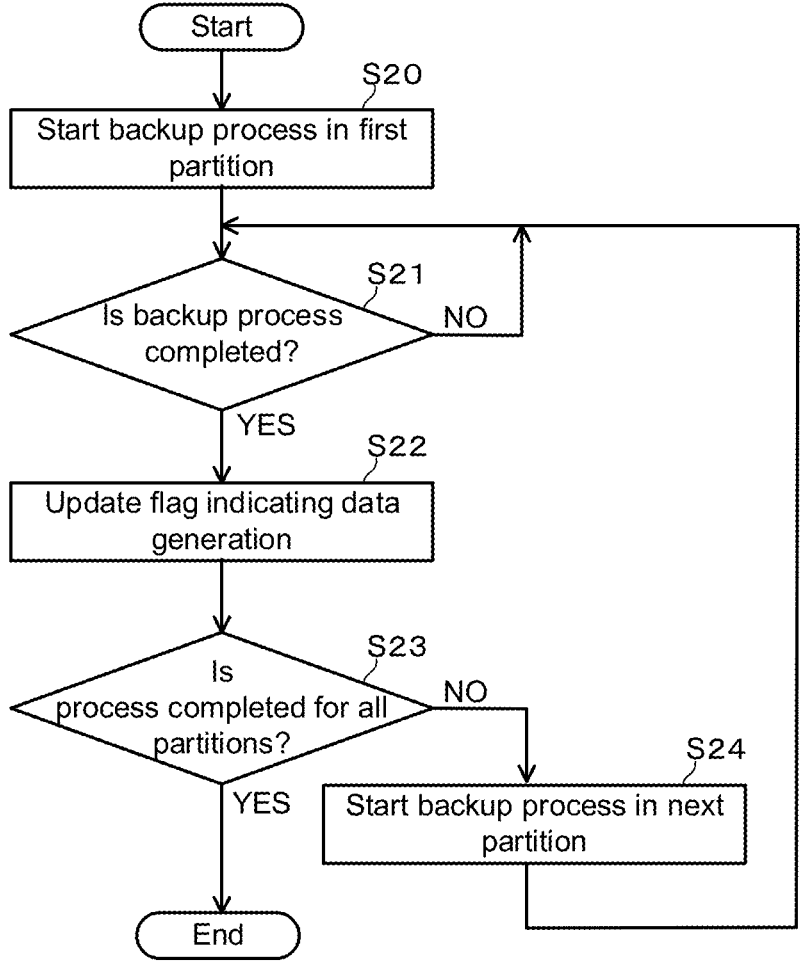
FIG. 4 is a flowchart for explaining an example of a data backup process.

Next, details of the data backup process will be described by way of example. FIG. 4 is a flowchart illustrating an example of the data backup process in detail. This backup process is a process that starts at step S2 in FIG. 2 and is performed until it is determined that the process has ended at step S3.

To begin with, as illustrated in FIG. 4, backup controller 15c starts a process of backing up data saved in the first partition (for example, partition 1 in FIG. 1) to a storage area of storage apparatus 13a (for example, storage area 13b in FIG. 1) (step S20).

Then, backup controller 15c determines whether or not the backup of the data saved in the partition has been completed (step S21). When the backup of the data has not been completed (step S21: NO), the process of step S21 is repeated.

When the backup of the data has been completed (step S21: YES), backup controller 15c updates a flag indicating a generation of the data set for the storage area for which the backup has been completed (for example, storage area 13b in FIG. 1) (step S22).

Specifically, it is assumed that the flag "in progress" is set for a storage area in which the latest backup data is saved, the flag "BK1" is set for a storage area in which the backup data from one generation ago is saved, and the flag "BK2" is set for a storage area in which the backup data from two generations ago is saved.

In this case, backup controller 15c changes the flag for the storage area for which the flag "BK2" is set to "in progress", changes the flag for the storage area for which the flag "BK1" is set to "BK2", and changes the flag for the storage area for which the flag "in progress" is set to "BK1".

When the next backup process is performed, backup controller 15c saves the latest backup data in the storage area for which the flag "in progress" is set, and overwrites the backup data from two generations ago with the latest backup data.

After the process of step S22, backup controller 15c determines whether or not the backup process has been completed for all the partitions (for example, partitions 1 to 5 in FIG. 1) (step S23).

When the backup process has not been completed for all the partitions (step S23: NO), backup controller 15c starts a process of backing up data saved in the next partition (for example, partition 2 in FIG. 1) to a storage area of storage apparatus 13a (for example, storage area 13c in FIG. 1) (step S24). Thereafter, the processes after step S21 are repeated.

In step S23, when the backup process has been completed for all the partitions (step S23: YES), the data backup process ends.

As described above, according to Embodiment 1, it is possible to easily satisfy a condition imposed on the activation time of the vehicle since in the vehicle in which the data backup process in storage apparatus 13a is being performed, sign detector 14 detects the completion of the charge process for the vehicle as a predetermined sign of turning on the ignition power supply, and when the completion of the charge process for the vehicle is detected, stop controller 15*d* stops the backup process prior to the turning on of the ignition power supply.

In addition, since backup controller 15*c* resumes the backup process when the charge process is resumed, the backup process can be effectively resumed when it becomes possible to safely back up the data without a bound by a condition imposed on the activation time.

Embodiment 2

In Embodiment 1, completion of the charge process is detected as a sign of turning on of the ignition power supply of the vehicle, but a speed of the vehicle lower than a defined value may also be detected as a sign of turning on of the ignition power supply of the vehicle. In Embodiment 2, such a case will be described.

The configuration of data saving system 10 is the same as that illustrated in FIG. 1. However, sign detector 14 detects a speed of the vehicle lower than a defined value as a sign of turning on of the ignition power supply.

When the speed of the vehicle is lower than the defined value, there is a possibility that the vehicle is then stopped and the ignition power supply is turned off and further turned on. Accordingly, sign detector 14 performs the above process as one means of detecting the sign of turning on of the ignition power supply of the vehicle.

The vehicle in this case includes not only an electric vehicle and a plug-in hybrid vehicle but also a fuel cell vehicle, an internal combustion engine vehicle, and the like. Here, the speed of the vehicle is detected by using a speed sensor or the like.

Then, when sign detector 14 detects the above sign of turning on of the ignition power supply of the vehicle during the execution of the data backup process in storage apparatus 13*a*, stop controller 15*d* instructs backup controller 15*c* to stop the backup process before the turning on of the ignition power supply.

As a result, as in Embodiment 1, a load applied to the activation process of the vehicle is reduced, and it is possible to easily satisfy a condition imposed on the activation time for activating the vehicle.

Figure 5:
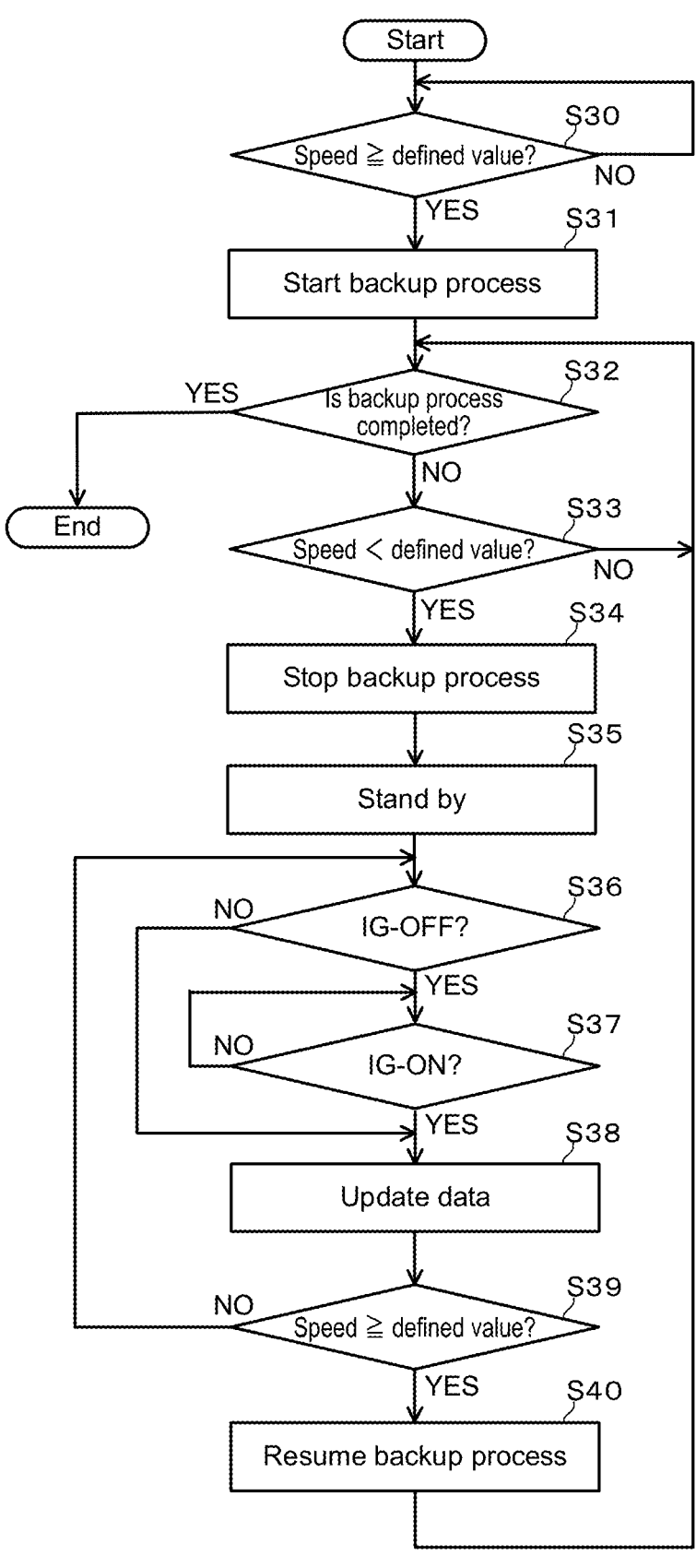
FIG. 5 is a flowchart illustrating an example of a data backup control process according to Embodiment 2.

Next, the data backup control process according to Embodiment 2 will be described with reference to FIG. 5. FIG. 5 is a flowchart illustrating an example of the data backup control process according to Embodiment 2. In the example of FIG. 5, the ignition power supply of the vehicle has already been turned on.

To begin with, as illustrated in FIG. 5, backup controller 15*c* determines whether or not the speed of the vehicle is equal to or greater than a defined value (step S30). When the speed of the vehicle is not equal to or greater than the defined value (step S30: NO), the process of step S30 is repeated until the speed of the vehicle becomes equal to or greater than the defined value.

When the speed of the vehicle is equal to or greater than the defined value (step S30: YES), backup controller 15*c* starts a data backup process (step S31). This backup process is the same as the process described with reference to FIG. 4.

Here, backup controller 15*c* may be configured not only to start the data backup process when the speed of the vehicle is equal to or greater than the defined value, but also to measure a load of information processing performed in data saving system 10 and start the data backup process at a timing when the load is equal to or smaller than a defined value.

Thereafter, backup controller 15*c* determines whether or not the backup process has been completed (step S32). When the backup process has been completed (step S32: YES), a series of processes including the data backup process ends. Eventually, the speed of the vehicle becomes smaller than the defined value, the vehicle is stopped, and the ignition power supply is turned off.

In step S32, when the backup process has not been completed (step S32: NO), sign detector 14 determines whether or not the speed of the vehicle is smaller than the defined value (step S33).

When the speed of the vehicle is smaller than the defined value, there is a possibility that the vehicle is then stopped and the ignition power supply is turned off and further turned on. Thus, sign detector 14 performs the above-described determination.

When the speed of the vehicle is not smaller than the defined value (step S33: NO), the process after step S32 is repeated.

When the speed of the vehicle is smaller than the defined value (step S33: YES), stop controller 15*d* instructs backup controller 15*c* to stop the backup process (step S34). Since this process can be executed in a short time, the backup process is stopped before the ignition power supply is turned on. Then, backup controller 15*c* enters a standby status (step S35).

Next, backup controller 15*c* determines whether or not the ignition power supply has been turned off (step S36). When the ignition power supply has been turned off (step S36: YES), backup controller 15*c* determines whether or not the ignition power supply has been turned on again (step S37). When the ignition power supply has not been turned on again (step S37: NO), the process of step S37 is repeated until the ignition power supply is turned on again.

When the ignition power supply is turned on again (step S37: YES) or when the ignition power supply is not turned off in step S36 (step S36: NO), saving controller 15*b* updates the data saved in storage apparatuses 11*a* and 12*a* (step S38). A situation in which the ignition power supply is not turned off occurs, for example, when the vehicle is waiting for a traffic light to change.

After that, backup controller 15*c* determines whether or not the speed of the vehicle is equal to or greater than the defined value (step S39). When the speed of the vehicle is not equal to or greater than the defined value (step S39: NO), the processes after step S36 are repeated.

When the speed of the vehicle is equal to or greater than the defined value (step S39: YES), backup controller 15*c* resumes the backup process (step S40).

In this case, there is a possibility that the data saved in storage apparatuses 11*a* and 12*a* has been updated in step S38. Thus, backup controller 15*c* resumes the backup process with the first data in the partition in which pieces of data saved when the backup process was stopped in step S34 are saved.

Note that backup controller 15*c* may determine whether or not the data has been updated, and when not, resume the backup process with the data saved when the backup process was stopped, as in the process of step S9 illustrated in FIG. 2.

Here, backup controller 15*c* may be configured not only to start the data backup process when the speed of the vehicle is equal to or greater than the defined value, but also to measure a load of information processing performed in data saving system 10 and resume the data backup process at a timing when the load is equal to or smaller than a defined value. Thereafter, the processes after S32 of steps are repeated.

As described above, according to Embodiment 2, it is possible to easily satisfy a condition imposed on the activation time of the vehicle since in the vehicle in which the data backup process in storage apparatus 13a is being performed, sign detector 14 detects a travel speed of the vehicle lower than the defined value as a predetermined sign of turning on of the ignition power supply, and when the travel speed of the vehicle lower than the defined value is detected, stop controller 15d stops the backup process prior to the turning on of the ignition power supply.

In addition, backup controller 15c resumes the backup process when the travel speed of the vehicle becomes higher than a predetermined value. Therefore, the backup process can be effectively resumed when the data can be safely backed up without a bound by the condition imposed on the activation time.

Embodiment 3

Regarding Embodiment 3, a case will be described in which a shift position of the vehicle set to a parking position (P position) is detected as a sign of turning on of the ignition power supply of the vehicle.

The configuration of data saving system 10 is the same as that illustrated in FIG. 1. However, sign detector 14 detects the shift position of the vehicle set to the parking position as the sign of turning on the ignition power supply.

When the shift position of the vehicle is set to the parking position, there is a possibility that the vehicle is then stopped and the ignition power supply is turned off and further turned on. Accordingly, sign detector 14 performs the above process as one means of detecting the sign of turning on of the ignition power supply of the vehicle.

The vehicle in this case includes not only an electric vehicle and a plug-in hybrid vehicle but also a fuel cell vehicle, an internal combustion engine vehicle, and the like. Here, setting the shift position of the vehicle to the parking position is detected by using a shift position sensor or the like.

Then, when sign detector 14 detects the above sign of turning on of the ignition power supply of the vehicle during the execution of the data backup process in storage apparatus 13a, stop controller 15d instructs backup controller 15c to stop the backup process before the turning on of the ignition power supply.

As a result, as in Embodiments 1 and 2, a load applied to the activation process of the vehicle is reduced, and it is possible to easily satisfy a condition imposed on the activation time for activating the vehicle.

Figure 6:
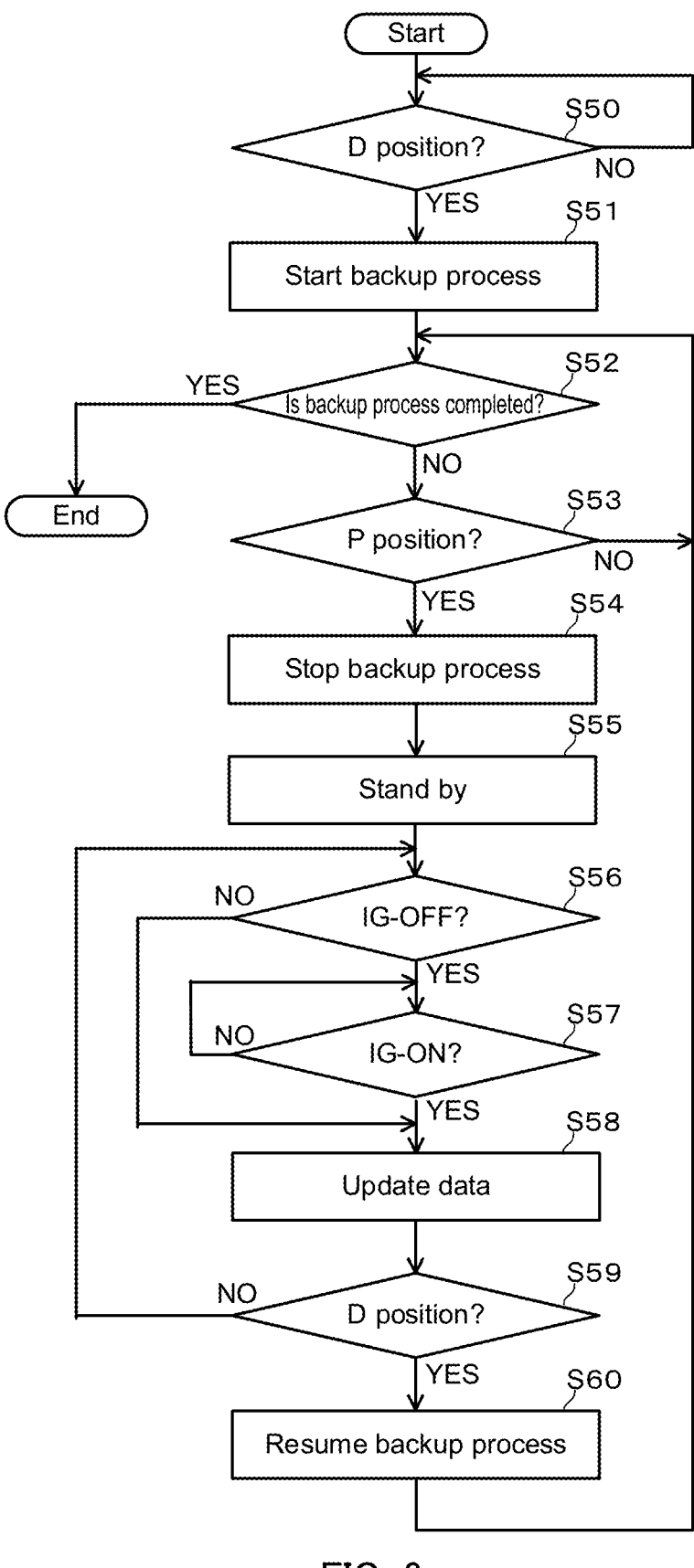
FIG. 6 is a flowchart illustrating an example of a data backup control process according to Embodiment 3.

Next, the data backup control process according to Embodiment 3 will be described with reference to FIG. 6. FIG. 6 is a flowchart illustrating an example of the data backup control process according to Embodiment 3. In the example of FIG. 6, the ignition power supply of the vehicle has already been turned on.

As illustrated in FIG. 6, backup controller 15c first determines whether or not the shift position of the vehicle is a drive position (D position) (step S50). When the shift position of the vehicle is not the drive position (step S50: NO), the process of step S50 is repeated until the shift position becomes the drive position.

When the shift position of the vehicle is the drive position (step S50: YES), backup controller 15c starts a data backup process (step S51). This backup process is the same as the process described with reference to FIG. 4.

Here, backup controller 15c may be configured not only to start the data backup process when the shift position of the vehicle is set to the drive position, but also to measure a load of information processing performed in data saving system 10 and start the data backup process at a timing when the load is equal to or smaller than a defined value.

Thereafter, backup controller 15c determines whether or not the backup process has been completed (step S52). When the backup process is completed (step S52: YES), a series of processes including the data backup process ends. Eventually, the vehicle stops and the shift position is set to the parking position, and the ignition power supply is turned off.

In step S52, when the backup process has not been completed (step S52: NO), sign detector 14 determines whether or not the shift position of the vehicle is the parking position (step S53).

When the shift position of the vehicle is set to the parking position, there is a possibility that the vehicle is then stopped and the ignition power supply is turned off and further turned on. Thus, sign detector 14 performs the above-described determination.

When the shift position of the vehicle is not the parking position (step S53: NO), the process after step S52 is repeated.

When the shift position of the vehicle is set to the parking position (step S53: YES), stop controller 15d instructs backup controller 15c to stop the backup process (step S54). Since this process can be executed in a short time, the backup process is stopped before the ignition power supply is turned on. Then, backup controller 15c enters a standby status (step S55).

Next, backup controller 15c determines whether or not the ignition power supply has been turned off (step S56). When the ignition power supply has been turned off (step S56: YES), backup controller 15c determines whether or not the ignition power supply has been turned on again (step S57). When the ignition power supply has not been turned on again (step S57: NO), the process of step S57 is repeated until the ignition power supply is turned on again.

When the ignition power supply has been turned on again (step S57: YES) or when the ignition power supply has not been turned off in step S56 (step S56: NO), saving controller 15b updates the data saved in storage apparatuses 11a and 12a (step S58). A situation in which the ignition power supply is not turned off occurs, for example, when the vehicle is waiting for a traffic light to changes.

Thereafter, backup controller 15c determines whether or not the shift position of the vehicle is the drive position (step S59). When the shift position is not the drive position (step S59: NO), the processes after step S56 are repeated.

When the shift position is the drive position (step S59: YES), backup controller 15c resumes the backup process (step S60).

In this case, there is a possibility that the data saved in storage apparatuses 11a and 12a has been updated in step S58. Thus, backup controller 15c resumes the backup process with the first data in the partition in which pieces of data saved when the backup process was stopped in step S54 are saved.

Note that backup controller 15c may determine whether or not the data has been updated, and when not, resume the backup process with the data saved when the backup process was stopped, as in step S9 illustrated in FIG. 2.

Here, backup controller 15*c* may be configured not only to start the data backup process when the shift position of the vehicle is set to the drive position, but also to measure a load of information processing performed in data saving system 10 and resume the data backup process at a timing when the load is equal to or smaller than a defined value. Thereafter, the processes after step S52 are repeated.

As described above, according to Embodiment 3, it is possible to easily satisfy a condition imposed on the activation time of the vehicle since in the vehicle in which the data backup process in storage apparatus 13*a* is being performed, sign detector 14 detects the shift position of the vehicle set to the parking position as a predetermined sign of turning on of the ignition power supply, and when the shift position of the vehicle set to the parking position is detected, stop controller 15*d* stops the backup process prior to the turning on of the ignition power supply.

In addition, backup controller 15*c* resumes the backup process when the shift position of the vehicle is set to the drive position. Therefore, the backup process can be effectively resumed when the data can be safely backed up without a bound by the condition imposed on the activation time.

Embodiment 4

Regarding Embodiment 4, a case will be described in which opening a door of the vehicle or performing a process of unlocking a door lock by a smart key is detected as a sign of turning on of the ignition power supply of the vehicle.

The configuration of data saving system 10 is the same as that illustrated in FIG. 1. However, sign detector 14 detects, as a sign of turning on of the ignition power supply, opening the door of the vehicle or performing the process of unlocking the door lock by the smart key.

When the door of the vehicle is opened, or when the process of unlocking the door lock by the smart key is performed, there is a possibility that the driver gets on the vehicle and the ignition power supply of the vehicle is turned on. Thus, sign detector 14 performs the above process as one means for detecting the sign of turning on the ignition power supply of the vehicle.

The vehicle in this case includes not only an electric vehicle and a plug-in hybrid vehicle but also a fuel cell vehicle, an internal combustion engine vehicle, and the like. Here, opening the door of the vehicle is detected by using a door sensor or the like, and performing the processing of unlocking the door lock by the smart key is detected by determining whether or not a signal for unlocking the door lock is received from the smart key.

Then, when sign detector 14 detects the above sign of turning on of the ignition power supply of the vehicle during the execution of the data backup process in storage apparatus 13*a*, stop controller 15*d* instructs backup controller 15*c* to stop the backup process before the turning on of the ignition power supply.

As a result, as in Embodiments 1 to 3, a load applied to the activation process of the vehicle is reduced, and it is possible to easily satisfy a condition imposed on the activation time for activating the vehicle.

Figure 7:
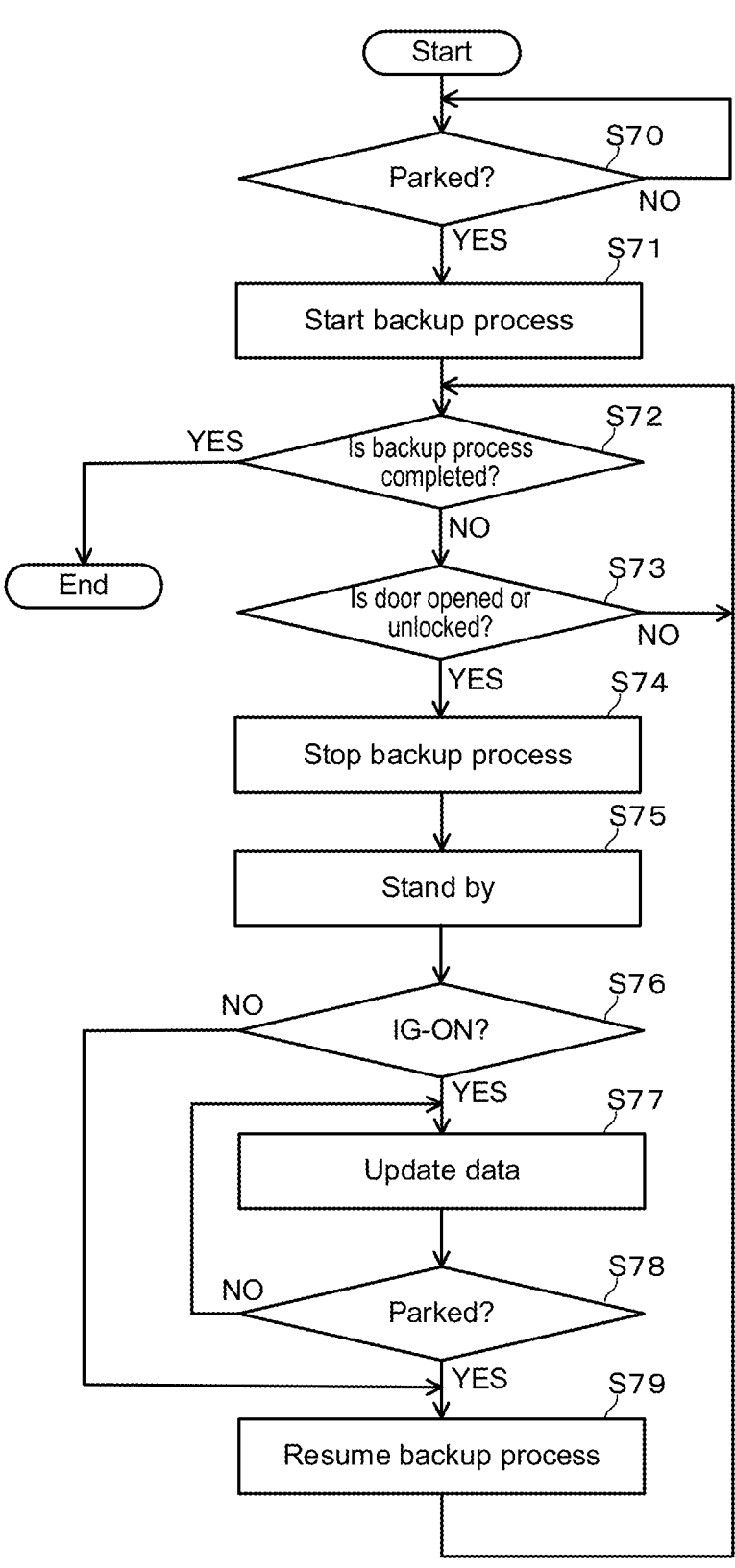
FIG. 7 is a flowchart illustrating an example of a data backup control process according to Embodiment 4.

Next, the data backup control process according to Embodiment 4 will be described with reference to FIG. 7. FIG. 7 is a flowchart illustrating an example of the data backup control process according to Embodiment 4.

As illustrated in FIG. 7, backup controller 15*c* first determines whether or not the vehicle is parked (step S70).

When the vehicle is not parked (step S70: NO), the process of step S70 is repeated until the vehicle is parked.

When the vehicle is parked (step S70: YES), backup controller 15*c* starts the data backup process (step S71). This backup process is the same as the process described with reference to FIG. 4.

Here, backup controller 15*c* may determine not only whether the vehicle is parked but also whether the vehicle is parked for a predetermined period or longer, and may start the backup process when the vehicle is parked for the predetermined period or longer. Alternatively, backup controller 15*c* may set a timer for a start time of the data backup process, and may start the data backup process when the set time is reached.

Thereafter, backup controller 15*c* determines whether or not the backup process has been completed (step S72). When the backup process is completed (step S72: YES), a series of processes including the data backup process ends.

In step S72, when the backup process has not been completed (step S72: NO), sign detector 14 determines whether or not the door of the vehicle has been opened or whether or not the process of unlocking the door lock by the smart key has been performed (step S73).

When the door of the vehicle is opened, or when the process of unlocking the door lock by the smart key is performed, there is a possibility that the driver gets on the vehicle and the ignition power supply of the vehicle is turned on. Therefore, sign detector 14 performs the above determination.

When the door of the vehicle is not opened or when the process of unlocking the door lock by the smart key is not performed (step S73: NO), the process after step S72 is repeated.

When the door of the vehicle is opened or when the process of unlocking the door lock by the smart key is performed (step S73: YES), stop controller 15*d* instructs backup controller 15*c* to stop the backup process (step S74). Since this process can be executed in a short time, the backup process is stopped before the ignition power supply is turned on. Then, backup controller 15*c* enters a standby status (step S75).

Next, backup controller 15*c* determines whether or not the ignition power supply has been turned on (step S76). When the ignition power supply has been turned on (step S76: YES), saving controller 15*b* updates the data saved in storage apparatuses 11*a* and 12*a* (step S77).

Thereafter, backup controller 15*c* determines whether or not the vehicle is parked (step S78). When the vehicle is not parked (step S78: NO), the process of step S77 is repeated.

When the vehicle is parked (step S78: YES), backup controller 15*c* resumes the backup process (step S79).

In this case, there is a possibility that the data saved in storage apparatuses 11*a* and 12*a* has been updated in step S77. Thus, backup controller 15*c* resumes the backup process with the first data in the partition in which pieces of data saved when the backup process was stopped in step S74 are saved.

Note that backup controller 15*c* may determine whether or not the data has been updated, and when not, resume the backup process with the data saved when the backup process was stopped, as in the process of step S9 illustrated in FIG. 2.

Further, backup controller 15*c* may determine not only whether the vehicle is parked but also whether the vehicle is parked for a predetermined period or longer, and may start the backup process when the vehicle is parked for the predetermined period or longer. Alternatively, backup controller 15c may set a timer for a start time of the data backup process, and may start the data backup process when the set time is reached. Thereafter, the processes after step S72 are repeated.

In step S76, when the ignition power supply is not turned on (step S76: NO), the process after step S79 is executed. A situation in which the ignition power supply is not turned on occurs, for example, when the driver simply opens and closes a door to pick up belongings left in the vehicle.

As described above, according to Embodiment 4, it is possible to easily satisfy a condition imposed on the activation time of the vehicle since in the vehicle in which the data backup process in storage apparatus 13a is being performed, sign detector 14 detects opening the door of the vehicle or performing the process of unlocking the door lock by the smart key as a predetermined sign of turning on of the ignition power supply, and when opening the door of the vehicle or performing the process of unlocking the door lock by the smart key is detected, stop controller 15d stops the backup process prior to turning on of the ignition power supply.

In addition, backup controller 15c resumes the backup process when the vehicle is parked. Therefore, the backup process can be effectively resumed when the data can be safely backed up without a bound by the condition imposed on the activation time.

Note that, in Embodiments 1 to 4, the data saved in storage apparatuses 11a and 12a is backed up to storage apparatus 13a mounted on the vehicle, but the data may be backed up to a storage apparatus that is not mounted on the vehicle, such as a storage apparatus included in a cloud server on the network.

In this instance, data saving system 10 illustrated in FIG. 1 includes a communication apparatus that exchanges data with the storage apparatus that is not mounted in the vehicle, instead of or in addition to ECU 13. In addition, backup controller 15c performs the process of backing up the data saved in storage apparatuses 11a and 12a to the storage apparatus that is not mounted in the vehicle, in the same manner as the methods described in Embodiments 1 to 4.

Further, in Embodiments 1 to 4, when a predetermined sign of turning on the ignition power supply of the vehicle is detected, the backup process is stopped before turning on of the ignition power supply, but not only the data backup process but also the data saving process may be stopped.

For example, it is assumed that the vehicle is configured such that, prior to turning on of the ignition power supply, data about the vehicle is saved in at least one of storage apparatuses 11a, 12a, and 13a.

In this case, sign detector 14 detects a predetermined sign of turning on of the ignition power supply in the vehicle in which the data saving process in at least one of storage apparatuses 11a and 12a, 13a is being executed, and when the sign is detected, stop controller 15d stops the above saving process prior to turning on of the ignition power supply.

Since it takes only a short time of about one second or less for stop controller 15d to stop the data saving process after sign detector 14 detects the sign, stop controller 15d can stop the backup process prior to turning on of the ignition power supply. Thus, a load applied to the activation process of the vehicle is reduced and the activation time of the vehicle is shortened. Accordingly, a condition imposed on the activation time can be easily satisfied.

Note that, since the data saving process is stopped prior to turning on of the ignition power supply, storage apparatus 13a in the above-described embodiments can easily satisfy the condition imposed on the activation time by using a consumer product such as a memory card conforming to SD standards, even when the time required for the backup process is not shortened by using an expensive storage apparatus having a high write speed. Further, by using such a memory card, it is possible to reduce the manufacturing cost and also to reduce the size of storage apparatus 13a.

Further, the functions of the respective sections of data saving system 10 described above may be implemented by a computer program.

In this case, a reading apparatus of a computer that implements the functions of the above-described sections by a program reads the program from a recording medium in which the program for realizing the functions of the above-described sections is recorded, and stores the program in a storage apparatus.

Alternatively, a communication apparatus communicates with a server apparatus connected to the network, and stores, in the storage apparatus, a program for implementing the functions of the respective sections downloaded from the server apparatuses.

Then, a processor copies the program stored in the storage apparatus to the memory, and sequentially reads and executes instructions included in the program from the memory, thereby implementing the functions of the respective sections described above.

Further, the following aspects are also understood to fall within the technical scope of the present disclosure.

(1) A data saving method according to an embodiment of the present disclosure includes: detecting a predetermined sign of turning on of an ignition power supply in a vehicle performing a saving process of saving data in a storage apparatus; and stopping the saving process before the turning on of the ignition power supply when the predetermined sign is detected.

(2) The predetermined sign includes completion of a charge process of charging the vehicle.

(3) The data saving method further includes resuming the saving process when the charge process is resumed.

(4) The predetermined sign includes a travel speed of the vehicle lower than a defined value.

(5) The data saving method further includes resuming the saving process when the travel speed of the vehicle becomes greater than a predetermined value.

(6) The predetermined sign includes a shift position of the vehicle set to a parking position.

(7) The data saving method further includes resuming the saving process when the shift position of the vehicle is set to a drive position after the vehicle is activated.

(8) The predetermined sign includes opening a door of the vehicle.

(9) The predetermined sign includes performing a process of unlocking a door lock by a smart key.

(10) The data saving method further includes resuming the saving process when the vehicle is parked after the vehicle is activated.

(11) The saving process includes a backup process.

(12) A data saving system according to an embodiment of the present disclosure includes: a sign detector that detects a predetermined sign of turning on of an ignition power supply in a vehicle performing a saving process of saving data in a storage apparatus; and a stop controller that stops the saving process before the turning on of the ignition power supply when the predetermined sign is detected.

(13) The predetermined sign includes completion of a charge process of charging the vehicle.

(14) The predetermined sign includes a travel speed of the vehicle lower than a defined value.

(15) The predetermined sign includes a shift position of the vehicle set to a parking position.

(16) The predetermined sign includes opening a door of the vehicle.

(17) The predetermined sign includes performing a process of unlocking a door lock by a smart key.

(18) The saving process includes a backup process.

(19) A non-volatile storage medium recording a data saving program according to an embodiment of the present disclosure causes a computer to execute: a sign detecting procedure of detecting a predetermined sign of turning on of an ignition power supply in a vehicle performing a saving process of saving data in a storage apparatus; and a stopping procedure of stopping the saving process before the turning on of the ignition power supply when the predetermined sign is detected.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Moreover, any combination of features of the above-mentioned embodiments may be made without departing from the spirit of the present disclosure.

While examples of the present disclosure have been described in detail above, those examples are mere examples and do not limit the scope of the appended claims. The techniques disclosed in the scope of the appended claims include various modifications and variations of the concrete examples exemplified above.

The disclosure of Japanese Patent Application No. 2022-007989, filed on Jan. 21, 2022, including the specification, drawings and abstract, is incorporated herein by reference in its entirety.

REFERENCE SIGNS LIST

10 Data saving system
11, 12, 13 Electronic Control Unit (ECU)
11a, 12a, 13a Storage apparatus
11b, 12b, 13b, 13c, 13e, 13f Storage area
14 Sign detector
15 Controller
15a Charge controller
15b Saving controller
15c Backup controller
15d Stop controller

The invention claimed is:

1. A data saving method, comprising:
determining that an ignition power supply in a vehicle has been turned off and that a charge process of charging the vehicle is started;
at least one of starting or resuming a saving process of saving data in a storage apparatus in the vehicle during the charge process and after the ignition power supply has been turned off;
detecting a predetermined sign of turning on the ignition power supply in the vehicle, while the vehicle is performing the saving process of saving the data in the storage apparatus; and
stopping the saving process before the turning on of the ignition power supply when the predetermined sign is detected.

2. The data saving method according to claim 1, wherein the predetermined sign includes completion of the charge process of charging the vehicle.

3. The data saving method according to claim 2, further comprising:
resuming the saving process when the charge process is resumed.

4. The data saving method according to claim 1, wherein the predetermined sign includes a travel speed of the vehicle being lower than a defined value.

5. The data saving method according to claim 4, further comprising:
resuming the saving process when the travel speed of the vehicle becomes greater than a predetermined value.

6. The data saving method according to claim 1, wherein the predetermined sign includes a shift position of the vehicle being set to a parking position.

7. The data saving method according to claim 6, further comprising:
resuming the saving process when the shift position of the vehicle is set to a drive position after the vehicle is activated.

8. The data saving method according to claim 1, wherein the predetermined sign includes opening a door of the vehicle.

9. The data saving method according to claim 1, wherein the predetermined sign includes performing a process of unlocking a door lock by a smart key.

10. The data saving method according to claim 8, further comprising:
resuming the saving process when the vehicle is parked after the vehicle is activated.

11. The data saving method according to claim 1, wherein the saving process includes a backup process.

12. A data saving system, comprising:
a processor; and
a memory including instructions that, when executed by the processor, cause the processor to:
determine that an ignition power supply in a vehicle has been turned off and that a charge process of charging the vehicle is started;
at least one of start or resume a saving process of saving data in a storage apparatus in the vehicle during the charge process and after the ignition power supply has been turned off;
detect a predetermined sign of turning on the ignition power supply in the vehicle, while the vehicle is performing the saving process of saving the data in the storage apparatus; and
stop the saving process before the turning on of the ignition power supply when the predetermined sign is detected.

13. The data saving system according to claim 12, wherein the predetermined sign includes completion of the charge process of charging the vehicle.

14. The data saving system according to claim 12, wherein the predetermined sign includes a travel speed of the vehicle being lower than a defined value.

15. The data saving system according to claim 12, wherein the predetermined sign includes a shift position of the vehicle being set to a parking position.

16. The data saving system according to claim 12, wherein the predetermined sign includes opening a door of the vehicle.

17. The data saving system according to claim 12, wherein the predetermined sign includes performing a process of unlocking a door lock by a smart key.

18. The data saving system according to claim 12, wherein the saving process includes a backup process.

19. A non-volatile storage medium recording a data saving program for causing a computer to execute:

determining that an ignition power supply in a vehicle has been turned off and that a charging process of charging the vehicle is started;

at least one of starting or resuming a saving process of saving data in a storage apparatus in the vehicle during the charging process and after the ignition power supply has been turned off;

detecting a predetermined sign of turning on the ignition power supply in the vehicle, while the vehicle is performing the saving process of saving the data in the storage apparatus; and stopping the saving process before the turning on of the ignition power supply when the predetermined sign is detected.

\* \* \* \* \*